(12) United States Patent
Iossa et al.

(10) Patent No.: US 8,403,345 B2
(45) Date of Patent: Mar. 26, 2013

(54) APPARATUS WITH WIRE CART FOR MOVING, STORING AND DISPENSING SPOOLED MATERIAL

(75) Inventors: Angelo Iossa, Chatham, NJ (US); Michael Iossa, Chatham, NJ (US); Kirk Thomson, Andover, NJ (US)

(73) Assignee: Michael Angelo Designs, LLC, Chatham, NJ (US)

( * ) Notice: Subject to any disclaimer, the term of this patent is extended or adjusted under 35 U.S.C. 154(b) by 61 days.

(21) Appl. No.: 13/107,469

(22) Filed: May 13, 2011

(65) Prior Publication Data

US 2012/0286491 A1 Nov. 15, 2012

(51) Int. Cl.
*B62B 1/06* (2006.01)
*B62B 1/26* (2006.01)

(52) U.S. Cl. .......... 280/79.6; 280/47.35; 280/79.3; 414/445; 414/911; 242/557

(58) Field of Classification Search .......... 280/47.34, 280/47.35, 79.11, 79.2, 79.3, 79.4, 79.6, 280/6.151; 414/434, 437, 444, 445, 787, 414/911; 242/557, 559, 561
See application file for complete search history.

(56) References Cited

U.S. PATENT DOCUMENTS

| | | | |
|---|---|---|---|
| 970,884 A * | 9/1910 | Carter | 242/129.6 |
| 1,153,476 A | 9/1915 | Anthony | |
| 1,168,946 A | 1/1916 | Leo | |
| 1,185,615 A | 6/1916 | Beaumont et al. | |
| 1,536,611 A * | 5/1925 | Duke | 414/469 |
| 1,587,842 A * | 6/1926 | Knox | 414/457 |
| 2,124,956 A | 7/1938 | Roemer | |
| 2,705,114 A * | 3/1955 | Worsham | 242/594.4 |
| 3,558,090 A * | 1/1971 | Bird | 248/309.1 |
| 3,650,419 A | 3/1972 | Upshur | |
| 3,652,026 A * | 3/1972 | Awebro | 242/557 |
| 3,690,491 A * | 9/1972 | Butler, Jr. | 414/483 |
| 3,831,877 A | 8/1974 | Bennett | |
| 3,837,549 A | 9/1974 | Sengewald | |
| 3,856,230 A | 12/1974 | Zimmer | |
| 3,863,778 A | 2/1975 | Martin, Sr. | |
| 3,887,254 A | 6/1975 | Landis | |
| 3,902,612 A | 9/1975 | Hall | |
| 3,913,762 A | 10/1975 | Alexander | |
| 4,006,865 A | 2/1977 | Howard | |
| 4,321,004 A | 3/1982 | Mills | |
| 4,457,527 A | 7/1984 | Lowery | |
| 4,557,716 A | 12/1985 | Ottaviano | |
| 4,558,833 A | 12/1985 | Speck | |

(Continued)

FOREIGN PATENT DOCUMENTS

| | | |
|---|---|---|
| EP | 0600770 | 6/1994 |
| EP | 2000424 A9 | 10/2008 |

(Continued)

*Primary Examiner* — Katy M Ebner
*Assistant Examiner* — Emma K Frick
(74) *Attorney, Agent, or Firm* — Gearhart Law, LLC

(57) ABSTRACT

The present invention is a unique cart for transporting and dispensing spooled or reeled materials such as wire, carpet, or cable. The apparatus allows a user to elevate a spool of material off the ground into a suspended position where the material can be unreeled, without the user having to manually lift the spool. The apparatus also allows the user to transport or move the elevated material from place to place while still in the cart. The apparatus also contains a feature for transport, storage, and unreeling of multiple spools of material.

9 Claims, 7 Drawing Sheets

U.S. PATENT DOCUMENTS

| | | | |
|---|---|---|---|
| 4,575,303 A * | 3/1986 | Lindell | 414/430 |
| D288,496 S | 2/1987 | Brownlie | |
| 4,777,976 A | 10/1988 | Johnston | |
| 4,913,459 A * | 4/1990 | Smeitink | 280/641 |
| 5,046,520 A | 9/1991 | Sanchez, Jr. | |
| 5,056,553 A | 10/1991 | Whitehead et al. | |
| 5,129,462 A * | 7/1992 | Mail | 172/19 |
| 5,188,308 A | 2/1993 | Tussing | |
| 5,253,972 A * | 10/1993 | Drew et al. | 414/469 |
| 5,275,349 A * | 1/1994 | Tussing | 242/557 |
| 5,285,981 A | 2/1994 | Pavelka | |
| 5,388,609 A | 2/1995 | Ghio et al. | |
| 5,417,384 A * | 5/1995 | Lindstrand | 242/557 |
| 5,509,671 A | 4/1996 | Campbell | |
| 5,551,647 A | 9/1996 | Browning | |
| 5,584,446 A | 12/1996 | Delmore et al. | |
| 5,598,985 A | 2/1997 | Winesett | |
| 5,626,307 A | 5/1997 | Smith | |
| 5,915,646 A | 6/1999 | Campbell | |
| 5,967,451 A | 10/1999 | Radaios | |
| 5,988,552 A | 11/1999 | Tisbo | |
| 6,077,029 A | 6/2000 | Johnson | |
| 6,260,790 B1 * | 7/2001 | Harrah | 242/557 |
| 6,270,094 B1 | 8/2001 | Campbell | |
| 6,390,495 B1 | 5/2002 | Cates | |
| 6,390,759 B1 * | 5/2002 | Novak et al. | 414/430 |
| 6,443,688 B1 | 9/2002 | Komdeur | |
| 6,526,734 B1 | 3/2003 | Huson et al. | |
| 6,742,740 B2 | 6/2004 | Tisbo et al. | |
| 6,834,827 B2 | 12/2004 | Burkitt | |
| 6,877,753 B2 | 4/2005 | Anderson | |
| 6,893,201 B2 | 5/2005 | Clery | |
| 6,902,130 B1 | 6/2005 | Salem | |
| 7,051,492 B2 | 5/2006 | Huson | |
| 7,150,459 B2 | 12/2006 | Anderson | |
| 7,188,843 B2 | 3/2007 | Magness | |
| 7,484,684 B2 | 2/2009 | Saavedra | |
| 7,566,196 B2 * | 7/2009 | French | 414/482 |
| 2005/0167935 A1 | 8/2005 | Weeks | |
| 2005/0238466 A1 * | 10/2005 | Henry | 414/444 |
| 2006/0214045 A1 | 9/2006 | Alkalay | |
| 2008/0048063 A1 | 2/2008 | Wells | |
| 2008/0066808 A1 | 3/2008 | Stein | |
| 2008/0111330 A1 | 5/2008 | Lurie | |
| 2008/0128543 A1 | 6/2008 | Rumczikas | |
| 2008/0209859 A1 | 9/2008 | Vanderheiden | |
| 2009/0169350 A1 | 7/2009 | Lamothe | |
| 2010/0006692 A1 | 1/2010 | Galgano | |

FOREIGN PATENT DOCUMENTS

| | | |
|---|---|---|
| JP | 04030106 | 3/1992 |
| WO | WO2004051106 A1 | 6/2004 |
| WO | WO2006010899 A2 | 2/2006 |
| WO | WO2007011377 A3 | 1/2007 |

* cited by examiner

APPARATUS WITH WIRE CART FOR MOVING, STORING AND DISPENSING SPOOLED MATERIAL

FIELD OF THE INVENTION

The invention relates to a cart, in particular to a spool and reel storing and dispensing cart.

BACKGROUND OF THE INVENTION

The construction, manufacturing and other related industries use various devices for dispensing materials that are commonly wound on spools or reels, such as wire, carpet, and cable. Installation of wire or cable in commercial or residential applications can require a great deal of material since the distances between end points. The spools can be quite heavy and cumbersome, especially when full. Devices designed to hold the spools that allow the user to unreel the material exist in the prior art, but may be difficult to use. One particular difficulty is lifting a heavy roll of material, for instance a large roll of wire, onto a device in order to dispense the wire; it may take two users working in tandem to lift some larger rolls onto the device, or it may take a machine or other tool. Another difficulty is keeping the device stationary, and, in some cases, upright, while unreeling the material, yet allowing the device to be moved when necessary. The present invention solves these problems through its unique design and features.

DESCRIPTION OF THE RELATED ART

U.S. Pat. No. 4,006,865 discloses a device with a plurality of box wire reels that are removably mounted in laterally tilted positions on a frame rendered mobile by tilting the frame off its base onto wheels. Each reel has a handle which holds its hub assembly assembled between axially adjustable wheel rims. Releasable latches hold the hub assembly in a radially adjusted position.

U.S. Pat. No. 5,551,647 discloses a portable cable feeding or dispensing device having a base adapted to be placed on and rest firmly on a floor, the ground or other support, stanchions affixed to the base and extending generally normally therefrom, shoulders on the stanchions formed by notches in an edge of each, a spool assembly having a hub, opposed first and second rims thereon, and an axle therethrough, the first rim being stationarily affixed on the spindle, the second rim or rims having a bearing for slidably mounting the same on the hub, a lock mechanism on the second rim or rims and hub for removably locking the same to the hub at a desired position therealong with respect to the first rim for confining therebetween coiled cable or cables mounted on the hub, the notches adapted to receive end portions of the axle lying outboard of the rims and support the spool for rotational motion for uncoiling and dispensing the cable.

U.S. Pat. Nos. 6,877,753 and 7,150,459 disclose a manually operated wheeled reel support and dispensing cart for supporting multiple reels of material and for dispensing the material from the reels. The cart includes a cart frame having spaced side members, handles for manual cart handling and a top cross brace, with the frame being connected to a support plate and wheel assembly. A plurality of spindle hinge elements, each having a pivot opening, are fixed in spaced relation on one of the frame side members and receive L-shaped removable spindle elements for pivotal opening and closing movement. When open, the spindle elements are supported so that reels can be added or removed. When the spindle elements are closed they secure reels of material to the cart. The cart mechanism has a stop plate and a lock plate fixed to respective frame side members to ensure against inadvertent separation of the spindle elements from the cart and to ensure locking of the spindle elements at their closed positions. The frame is also provided with storage lock plates and spindle storage rings for storing and securing spindles that have been removed from their spindle hinge elements.

U.S. Pat. No. 3,856,230 discloses a cart that is essentially a combination of a known type of two-wheeled hand dolly and a rigid supplemental frame superstructure, essentially of welded angle iron and bar construction, being itself welded at opposite front and rear end parts to tubular side members of the dolly and the latter's standard rigid sheet metal foot plate. Angle iron side members of the said superstructure have their side flanges disposed to extend laterally outwardly, and their 90.degree. upright flanges carry pairs of laterally aligned, acutely angled oblique notches or slots, in which notch pairs horizontal reel spindle or axle pieces are removably received, said pieces each serving as a journal for one or more conventional side-flanged reels or spools bearing electrical wire stock. A relatively wide and flat rubber restraining or braking strap is provided adjacent each pair of said notches, the strap at its ends having hooked plastic clips which adjustably receive and snub said rubber strap ends. The clip hooks are releasably engaged about the side angle flanges of the cart's superstructure, the straps bearing frictionally against the circular reel flanges to restrain undesired reel overrun as a length of wire is drawn from the reel's cylindrical spool part. The straps may also be used to restrain from movement out of the cart superstructure notches any axle or axles not bearing a reel by simply spiraling the strap snugly about the reel spindle. By preference, the basic dolly component of the cart is provided on its tubular hand-held cross piece with a removable split cylindrical sleeve of rubber, which acts as a frictional brake bearing on the floor, when the cart is in horizontal position, to restrain possible rolling movement.

The prior art describes devices that are similar to hose reels or hand trucks, in which a spool of material is manually lifted from the floor up to a spindle or reel. The devices may be front-heavy and have a tendency to tip when the material is unreeled, and some have many parts that need to be adjusted or fastened. Additionally, devices in the prior art may be large and cumbersome due to their weight. The present invention eliminates lifting and provides improved stability through the use of an ingenious, unique and non-obvious design that is elegant in the simplicity of its use while also improving on the functionality of the prior art.

SUMMARY OF THE INVENTION

The present invention discloses an apparatus having a first support frame and a second support frame of equal dimensions. The first and the second support frame have at least one stop; each support frame also has an axle support cam, and each axle support cam has a locking cam. The locking cams are disposed at distal ends of each axle support cam. The first and second support frames are joined by at least one connector.

A preferred embodiment of the present invention consists of a hexagonal cart. The cart uses a main axle to support a reel. The cart has two identical support frames that are hexagonal in shape and are joined by connectors. Each support frame has an axle support cam for lifting the main axle and an elliptical cam for guiding it into a locking cam that secures the main axle; the axle support cams, elliptical cams and locking cams are preferably minor images of each other on the first and second support frames, and operate in tandem. The purpose of the main axle is to support a spool of material, such as wire or rope, inside the cart while the material is unreeled.

To operate the cart, a user places the main axle through the center opening of a spool of material, and both are then rolled into the cart, where each distal end of the main axle is aligned with the appropriate axle support cam on each support frame of the cart. The cart is then rolled by the user. As the user rolls the cart, the distal ends of the main axle roll along the axle support cams into a locking cam on each support frame; the locking cams are placed so as to suspend the main axle and the spool above ground level. Once the distal ends of the main axle are resting in the locking cams, the user stops the rolling motion and the cart rests on one facet of each of the support frames. The hexagonal shape of the cart keeps it from rolling or moving around once the spool is in place because the cart is resting on the flat surface of the facets.

The result is that the spooled material, such as a roll of wire, is elevated from floor level and secured on a rotatable main axle so it can be dispensed. The elimination of the manual labor involved in lifting the spooled material onto a dispensing device allows one person to do what previously was often a two person job, and also reduces the risk of back injury or other injury to the user. This cuts cost to a user and/or an employer.

When the user desires to remove the spool with any remaining material from the cart, he rolls the cart further in the same direction. The main axle is released and rolled back down to ground level, where it can be rolled out of the cart with the spool and any remaining material.

The design of the cart provides stability when the user is dispensing the material; devices in the prior art may be prone to tipping over when heavy loads are placed on them, particularly when the wire, carpet, or cable is pulled on to unreel it. The present invention is low to the ground and also allows the weight of the load to be distributed evenly and below its center of gravity to prevent tipping. In addition, the spool of material is kept in the center of the cart; any shifting in the center of gravity is minimal, thus preventing accidents due to significant shifts in the center of gravity. This reduces the risk of injury to the user and reduces work hours involved in repositioning a toppled cart and material, thereby further reducing cost to the user and/or employer.

Unlike devices in the prior art that may have locking mechanisms, pins, etc., the present invention is easy to use; the unique design of the cart allows the axle with the spool and material to be held in place in the locking cams using their own weight in combination with gravity. The only knowledge required to use the invention is how to place the main axle through the spool and then onto the axle support cams, and how to roll the cart, which should be intuitive to most users. Also, since there are only two components, the cart and the main axle, there are no small pieces to get lost or accidentally interchanged.

The preferred embodiment of the present invention has wheels on one facet of each of the support frames to allow the cart to be rolled to wherever the user desires. The present invention is not as heavy or cumbersome as devices in the prior art, so it can be more easily manipulated when in use, and more easily lifted and moved by a user when not in use. Additionally, the shape and compact nature allow multiple carts to be stacked together for storage, thus decreasing the need for storage space.

Although the present invention will be discussed primarily for use with wire, it may be used with any spooled or reeled material, including but not limited to, wire, cable, carpet, tubing (such as but not limited to copper or polyethylene tubing), chain, rope, rolls of sheet metal, plastic sheet or wrap, paper, tissue, yarn, textiles, bales, or feed spools.

It is an object of the invention to provide an apparatus to dispense spooled or reeled material.

It is an object of the invention to reduce lifting when working with spooled or reeled materials.

It is an object of the invention to provide an axle support cam to lift an axle containing spooled or reeled material off of the ground and to suspend the material for unreeling.

It is an object of the invention to provide an apparatus with improved stability for dispensing spooled or reeled materials.

It is an object of the invention to provide an improved method for dispensing wire, carpet, cable, rope, chain, or any spooled or reeled material.

It is an object of the present invention to provide a relatively light weight device for transporting and dispensing reels of spooled material.

It is an object of the invention to provide an apparatus that is stackable and thus easy to store.

It is an object of the invention to provide a dispensing device for spooled or reeled materials that is stable in that forces associated with dispensing occur below the center of gravity.

It is an object of the invention to provide a spooled or reeled materials dispensation apparatus where the axle is secured without using any type of external means (ex. pins, clips, et al.), thus allowing ease of use.

It is an object of the invention to provide storage for multiple spools of material.

It is an object of the invention to allow multiple spools of material to be unreeled from one apparatus.

It is an object of the invention to allow multiple spools of material to be transported on one apparatus.

DESCRIPTION OF THE PREFERRED EMBODIMENTS

Figure 1A:
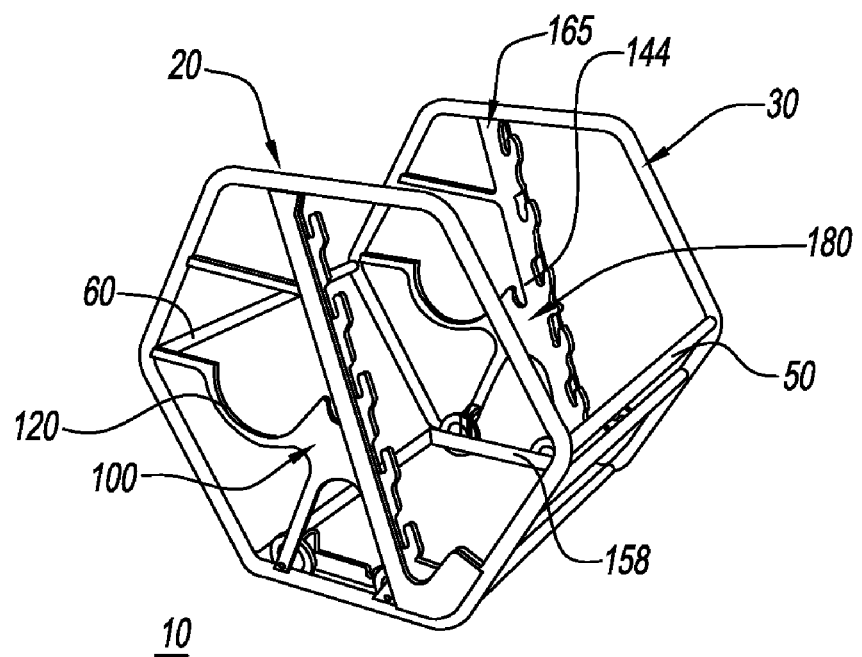
FIG. 1A is a perspective view of the preferred embodiment of the present invention.

The preferred embodiments of the present invention will now be described with reference to the drawings. Identical elements in the various figures are identified with the same reference numerals. FIG. 1A is labeled in great detail; the subsequent figures are labeled only to the extent necessary to emphasize particular features.

The terms 'spool' and 'reel' are used throughout this application to indicate a central core around which material is wound. The terms and their various noun and verb forms may be used interchangeably, as both are used by those skilled in the art. Whenever one of these terms is used in this application, it is understood to be interchangeable with the other.

FIG. 1A is a perspective view of the preferred embodiment of the present invention. FIG. 1A shows a spool reeling and dispensing cart apparatus 10, with two parallel support frames joined by connectors.

FIG. 1A shows a first, substantially rigid, circular or polygonal support frame 20 having at least five facets. The frame has a first support frame first facet 21, a first support frame second facet 22, a first support frame third facet 23, a first support frame fourth facet 24, a first support frame fifth facet 25, and a first support frame sixth facet 26.

FIG. 1A also shows a second substantially rigid, circular or polygonal support frame 30 having at least five facets. This support frame has a second support frame first facet 31, a second support frame second facet 32, a second support frame third facet 33, a second support frame fourth facet 34, a second support frame fifth facet 35, and a second support frame sixth facet 36.

Support frames 20 and 30 may be connected by substantially rigid connector rods 50. The connection between the support frames and the connector rods may, for instance, occur at a connector rod first end 52 and a connector second end 54. Connector first end 52 may, for instance, be joined to first support frame 20, and connector second end 54 may be joined to second support frame 30. The support frames are preferably connected so that they are parallel to each other, and they are preferably mirror images of each other with respect to their supported components.

FIG. 1A depicts an embodiment of the invention with three connectors; the invention has at least one connector, but may have any number of connectors, with the preferred number between one and five. The connectors are preferably all the same length and diameter, but may be differing diameters.

FIG. 1A also shows a roll prevention stop 60, with a roll prevention stop first end 62, and a roll prevention stop second end 64. The roll prevention stop first end 62 may, for instance, be joined to the first, support frame 20, and the stop second end may be joined to the second support frame 30. The function of the stop may include keeping the cart from rolling once the spool is in place in the locking cam. The roll prevention stop 60 may be present in all embodiments, including those in which the shape of the support frames is such that the cart can more easily roll, for instance in the case of circular support frames. The rolling motion may, for instance, cease when the stop portion of the apparatus contacts the floor or ground. The roll prevention stop 60 is depicted in FIG. 1A as a single bar, but it may be a device such as, but not limited to, a series of bars, a shorter bar or 'foot' similar to a doorstop, or any structure that would stop a cart from rolling.

In a preferred embodiment, both the substantially rigid connector rods 50 and the roll prevention stop 60 may be of a fixed length. They may also be adjustable using a method such as, but not limited to, a telescoping method or other method, making the width of the cart adjustable.

Also depicted in FIG. 1A are support cams 100. Support cams 100 may, for instance, be disposed on the first support frame 20 and on the second support frame 30. (A detailed view of a support cam 100 is shown in FIG. 2A). Seen as part of support cams 100 is a roll-off aid cam section 70, with a roll off aid cam first end 72 and roll off aid cam second end 74. In a preferred embodiment, each support frame may have an identical roll-off aid disposed above the axle support cam 100. The roll-off aids may be connected by the roll-off aid first end 72 to a facet of the support frame, and by the roll-off aid second end to a terminator 140 which has storage slots 144. As noted above, the support frames may be connected so that their supported components mirror each other; therefore, the roll-off aids may be directly parallel to one another. The roll-off aid assists in removing an axle from the invention, and will be discussed in further detail with FIGS. 4A-4C.

In the preferred embodiment, the dimensions of the first support frame and second support frame are equal. These dimensions may vary depending on the use to which the spool reeling and dispensing cart apparatus 10 is put, and are discussed in more detail in connection with FIG. 1B.

FIG. 1A also shows an axle support cam 100 on each support frame, with the first support frame and the second support frame aligned substantially parallel to each other. The axle support cam 100 may have an axle support cam first end 102, an axle support cam distal end 104, and an axle support cam support bar 106.

Axle support cam 100 may consist of three connected components; a straight cam section 110, with a straight cam first end 112 and a straight cam second end 114; a concave cam section 120, with a concave cam first end 122 and a concave cam second end 124; and an axel locking cam section 130, with a locking cam first end 132 and a locking cam second end 134. In FIG. 1A the three components are shown as one integral piece, with the elliptical cam between the straight cam and the locking cam. This is the preferred embodiment; other possible embodiments are discussed later. The function of the cams will be discussed in more detail in FIGS. 3A-3C.

On each of the first support frame and second support frame, an axle support cam 100 may be joined to a facet of the support frame on an axle support cam first end 102, and to a first axel storage rack 155 on the axle support cam second end 104. The first axel storage rack 155 may contain multiple storage slots 144 for storing smaller spools of material. This will be discussed in more detail with regard to FIG. 6. As noted above, the two support frames may be substantially parallel and their supported components may be minor images of each other, so that each support frame may have a cam plate 71 disposed substantially opposite and parallel to the cam plate 71 on the other support frame.

FIG. 1A also shows a mobility aid 170, with wheels 172 and wheel bar 174. The wheel bar 174 holds the wheels and also joins the mobility aid to a facet on the support frame. Although the wheel bar is depicted on the inside of the apparatus, it may be disposed on the outside. The wheels 172 may be held in place by, but are not limited to, axles, casters or other supporting devices such that they have only forward motion, 360° motion, or some range of motion between. The wheels may have stops on them to lock them in place.

Mobility aids 170 may be disposed on each of the first support frame and the second support frame, on corresponding parallel facets such that the invention 10 may be easily moved from place to place. The mobility aid may be a set of wheels, or it may be anything that allows the invention to be moved, including but not limited to, permanent or detachable runners (similar to skis), a friction-reducing coating, or a rack of ball-bearings.

The connector 50, stop 60, roll-off aid 70, terminator 140 with storage slots 144, axle support cam 100, axle support cam support bar 106 and mobility aid 170 may be joined to the support frames by any method, including but not limited to welding, adhesion, a nut and bolt system, or being cast or molded integral to the support frames during manufacture.

The components of the invention and the supporting structures may be made from hollow tubes or solid material, such as but not limited to, hollow metal or PVC tubing or solid bar. A preferred material for the support frames, connectors, and stop is steel tubing.

The materials of manufacture for the present invention include, but are not limited to, metals and metal amalgams, such as but not limited to, iron, steel, aluminum, tin or copper; thermoplastics, elastomers, thermoplastic elastomers, and plastics, such as but not limited to, PVC, ABS, Polycarbonate, Noryl™, Polystyrene, ABS/PVC, PVC/Acrylic, Polysulfone, Acrylic, Polyethylene, Kydex™, PETG; resins; wood; rubber including but not limited to natural rubber, SBR, Isoprene rubber, Butadiene rubber, and Chloroprene rubber; foam; silicones and glass such as but not limited to, fiberglass, borosilicate, or quartz; textiles; composites; or any combination of the above materials or the above materials with any other materials and new materials that may be manufactured in the future.

The various components or sections of the present invention may be manufactured from identical or different materials, combinations of materials, or composites of materials. Some components may be made from different materials than the overall structure of the apparatus 10. For example, the mobility aid 170 may be entirely made out of cushioning or frictional material such as rubber, plastics or resin. Additionally, the first and second support frames 20 and 30 may have cushioning elements that are capable of absorbing noise and improving ergonomic aspects of the present invention. In an alternative embodiment, the first or the second support frames 20 or 30 or the connectors 50 may have hooks, fasteners or other attachment means to accommodate a weather hood, such as tarp, plastic sheeting or any other type of weather covering. The weather covering may be used to protect the apparatus 10 or the loaded reels and any tools loaded thereon from environmental elements or for aesthetic or camouflage reasons.

Figure 1B:
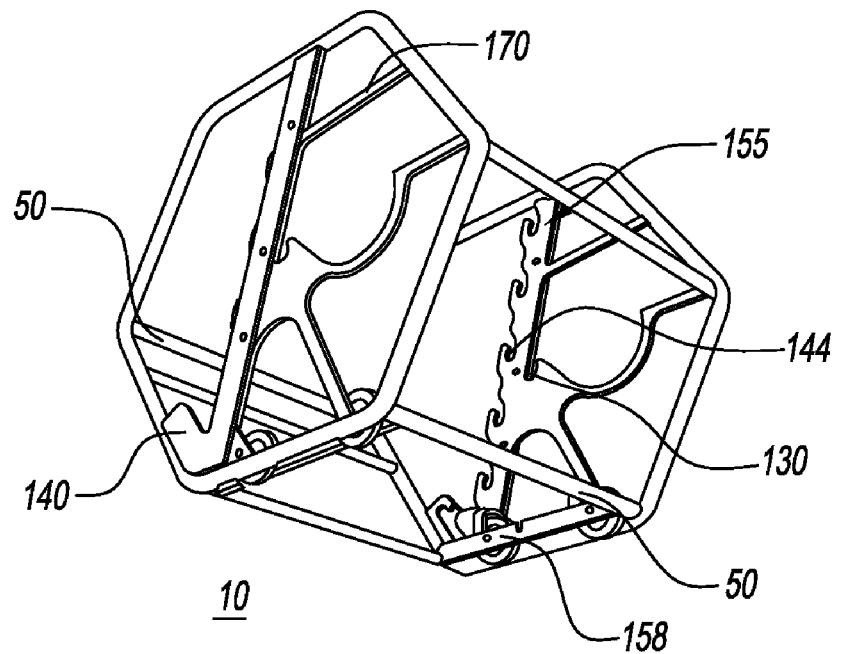
FIG. 1B is a perspective view of a preferred embodiment of the present invention.

FIG. 1B is a perspective view of a preferred embodiment of the present invention 10. Although in the preferred embodiment the length 90 is fixed, the length 90 may be fixed or adjustable; the length could be adjusted by making the connectors 50 and the stop 60 into telescoping structures, overlapping angle irons held at length by fasteners, or by other methods.

The height and depth of the invention may also be altered. In such a case, the dimensions of roll-off aid 70, terminator 140 with storage slots 144, axle support cam 100, axle support cam support bar 106 and mobility aid 170 may be altered so as to fit the new dimensions of the support frames 20 and 30, but will remain in the same relative proportion to each other and to the support frames that they exhibit in the preferred embodiment of FIG. 1A.

The shorter length or smaller invention may be used for construction work in a home, where less material is needed and the spools are therefore smaller, whereas the longer length invention may be used for commercial applications. Alternately, differing lengths or sizes of the invention may be used for different materials or for different thicknesses or gauges of the same material.

In the preferred embodiment, the dimensions of the first support frame and second support frame are equal. These dimensions can vary depending on use; the length 90 may be from one foot to 100 feet, with a preferred length of three feet. The height may be from one foot to 100 feet, with a preferred height of 35 inches, and the preferred depth may be from one foot to 100 feet, with a preferred depth of 19 inches. The overall length of the connector(s) 50 and stop 60 are the length required to join the two support frames. The diameter or thickness of the support frames, connector(s), and stop may be 1/64 inches to 3 feet, with a preferred diameter of one inch.

The overall length of the axle support cam is preferably from 6 inches to eighty feet, with a more preferred length of 6 inches to eight feet. The axle support cam can preferably support between 0.5 pounds and 10 tons. This weight may be shared between the two parallel axle support cams or may be supported by one axle support cam. The length of the straight cam, elliptical cam, and locking cams is preferably between 0.1 inch and five feet. The distance between the axle support cam 100 and the roll-off aid 70 is preferably between 0.1 inches and 5 feet. The diameter or thickness of these components is from 1/64 inches to 5 feet.

The length and width of the terminator 140 is such that it traverses the support frame 20 (or 30) so that it can support the axle support cam 100 and the roll-off aid 70. The length and width of the axle support cam support bar is such that it traverses the space between the axle support cam 100 and a facet (or portion for a non-hexagonal frame) of the support frame 20 (or 30). The diameter or thickness of the terminator is 1/64 inches to 5 feet.

The axle support cam 100 with its components, axle support cam support bar 106, the roll-off aid 70, and terminator 140 may be integral to the support frame or may be attachable and removable. All or one of the support frames, their components, the connector(s), and stop may be tubular or non-tubular.

Figure 1C:
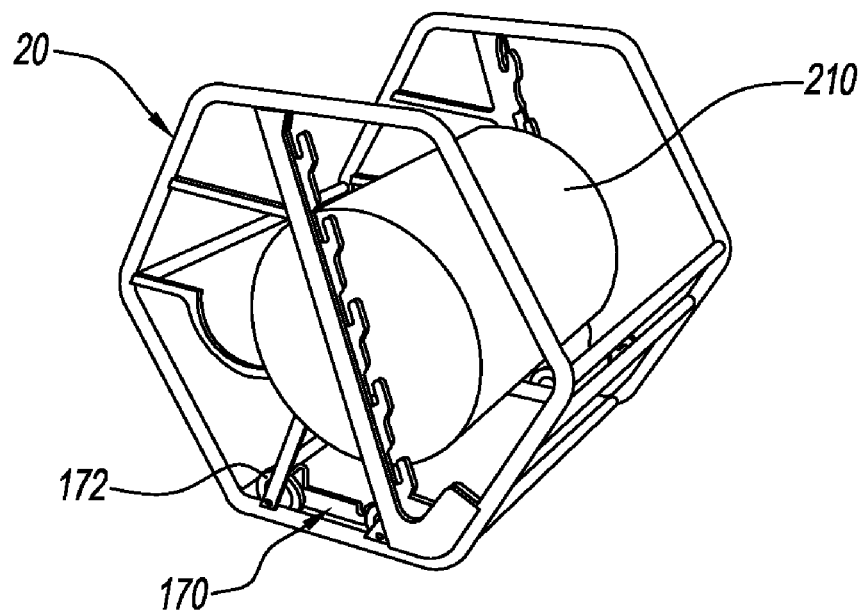
FIG. 1C is a perspective view of a preferred embodiment of the present invention in use.

FIG. 1C is a perspective view of a preferred embodiment of the present invention in use. FIG. 1C shows the invention 10, first support frame 20, second support frame 30, connector 50, stop 60, roll-off aid 70, axle support cam 100, terminator 140 with storage slots 144, main axle distal end 152, lateral flange 156, spool 160, material reel 210, and mobility aid 170.

In FIG. 1C, the material reel 210 may, for instance, be wire wound around a material spool 160, which is disposed on the main axle. The main axle may resting in the locking cam 130; shown in FIG. 1C is the main axle distal end 152 and the lateral flange 156.

As can be seen in the figure, the material reel 210 is suspended off the ground, making it relatively easy to manipulate. FIG. 1C shows the invention in a position in which the material reel 210 can be moved from one location to another by rolling on the mobility aid 170. This is desirable, for instance, when one is installing wire in various rooms of a house, or through a commercial building over long distances.

Figure 1D:
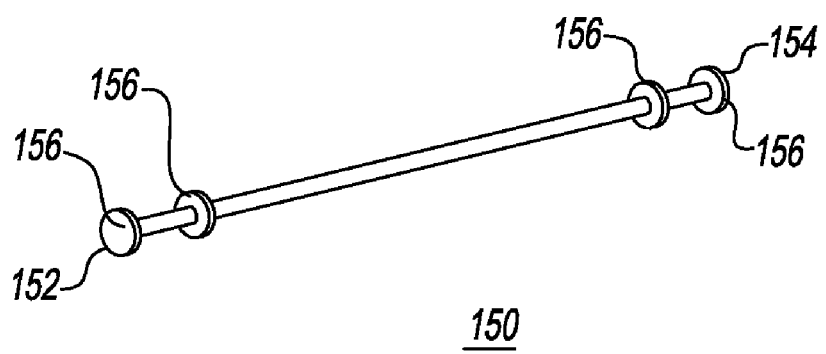
FIG. 1D is a perspective view of a main axel.

FIG. 1D is a view of a supporting structure, specifically a main axle. FIG. 1D shows the main axle 150, with the main axle first end 152, the main axle second end 154, and the axle lateral flanges 156. The axle lateral flange 156 may be on the main axle first end 152 and the main axle second end 154. In a preferred embodiment, the lateral flanges 156 are fixed and are able to fit through the center of the spool when the axle is disposed through the spool. The function of the lateral flanges 156 is to guide the main axle 150 along the axle support cam 100, and to help secure the main axle 150 in the locking cams 130.

Although the lateral flanges 156 are preferred to be fixed and may be integral with the axle 150, they may also be moveable and therefore able to slide along the length of the main axle, or they may be removable. They may have a stop or lock disposed on them to keep them in a desired place, or the main axle may have stops or locks disposed on it. This may be desired if the same main axle 150 is used with different widths of the apparatus 10.

A handle, crank, or other device may be fitted to one or both of the main axle distal ends 152 for rotating the main axle.

This would make it easier to reel material off of the spool and back onto the spool. This could be motorized or operated manually.

The removable main axle is capable of being mounted on and spanning the distance between the axle support cams. The dimensions of the main axle 150 are from 1 inch to 90 feet in length, and from 1/64 inches to 5 feet in diameter for a preferred embodiment. The main axle 150 is slightly longer than the apparatus 10, so that the main axle distal ends 152 can fit in the axle support cams 100 with a small overhang. However, the main axle 150 can be any axle that is long enough to traverse the space between the first support frame and second support frame, including axles that are significantly longer than that space provided the axle can be maneuvered into the proper position on the axle support cams. In this case the position of the lateral flanges 156 would be adjusted, if necessary, if needed to guide the axle along the axle support cam. For instance, it may be necessary to use a longer axle when the main axle 150 that was manufactured to be used with the apparatus 10 is unavailable, and the longer axle is all that is available.

The main axle may be permanently installed in a reel, such that the reel contains its own permanent main axle. This may be desirable, for example, for manufacturers who load up reels with material and have an exchange program, where a user exchanges an empty reel for a full reel. This would eliminate the step of threading the axle through the spool opening and could save time for the consumer. It would also ensure that the axle would fit through the center opening in the spool.

Figure 2:
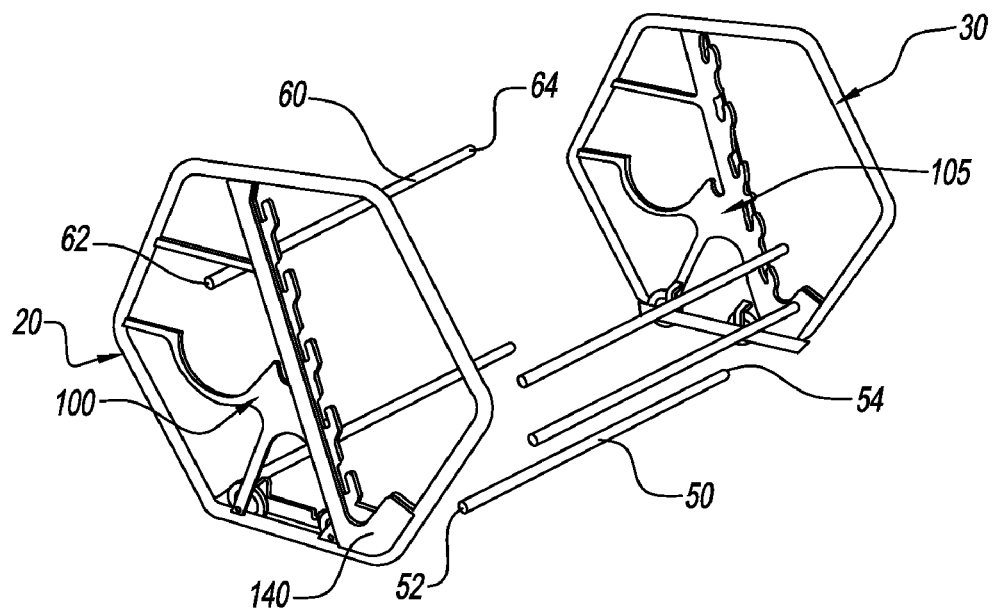
FIG. 2 is an exploded view of the present invention.
Figure 2A:
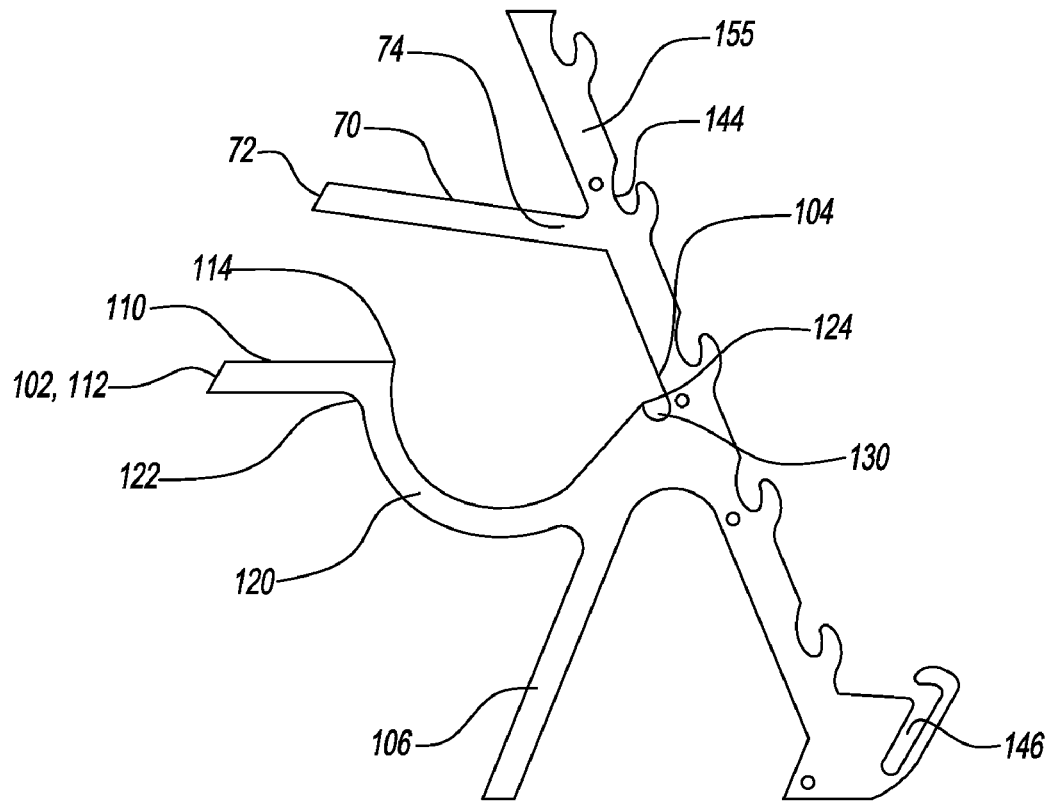
FIG. 2A is a detail view of the cam plate.

FIG. 2 is an exploded view of the present invention. FIG. 2 shows an apparatus 10, with first support frame 20.

Also shown in FIG. 2 is a second support frame 30.

In FIG. 2, there are four connectors 50, with connector first end 52 and connector second end 54, a stop 60, with stop first end 62 and stop second end 64, support cams 100 having a roll-off aid 70, with roll off aid first end 72 and roll off aid second end 74, an axle support cam 100, with axle support cam first end 102 and axle support cam distal end 104, an axle support cam support bar 106, a straight cam 110, an elliptical cam 120, a locking cam 130, a terminator 140 with storage slots 144, a mobility aid 170, wheel 172, and a wheel bar 174.

FIG. 2 shows how the invention is assembled. In FIG. 2, the connectors 50 and the stop 60 are also identical. This results in lower design and manufacturing costs in that only two pieces need to be manufactured, the support frame with its components and the connector. The connector can be cut from commonly available tubing or bar, further reducing cost. The mobility aid can be added after the frames are manufactured and the invention is assembled, and can be sold with the invention or as a separate component. Alternately, the mobility aid can be added during manufacture, and may or may not be integral with the support frames.

The support frames 20 and 30 are polygonal and are depicted as hexagonal, but may be any geometric shape, including but not limited to, hexagon, octagon, square, circle, circular with one or more flat sides, or any polygon or other shape. Both support frames are preferably the same shape and are made from the same materials, but they can be differing shapes and of differing materials. Preferably support frame 20 and 30 are minor images of each other.

The stop 60 does not have to be identical to the connectors 50, and multiple connectors need not be identical to each other. In a preferred embodiment the connectors are all the same length. The connectors may or may not all be the same length, and may be varying diameters and may be made using varying materials. For instance, it may be desirable to manufacture the stop from metal and the connectors from plastic or resin to reduce cost or weight of the invention. It may also be desirable to make the stop a larger diameter than the connectors in order to provide a sturdy stop yet smaller connectors so as to provide more space in the reel set up area for maneuvering the reel.

FIG. 2A is a detail view of a support cam 100 with supporting components. FIG. 2A shows the roll-off aid 70, with roll off aid first end 72 and roll off aid second end 74, the axle support cam 100, with axle support cam first end 102 and axle support cam distal end 104, the axle support cam support bar 106, a straight cam 110, with straight cam first end 112 and straight cam distal end 114, an elliptical cam 120, with elliptical cam first end 122 and elliptical cam distal end 124, a locking cam 130, with locking cam first end 132 and locking cam distal end 134, with storage slots 144.

Figure 3A:
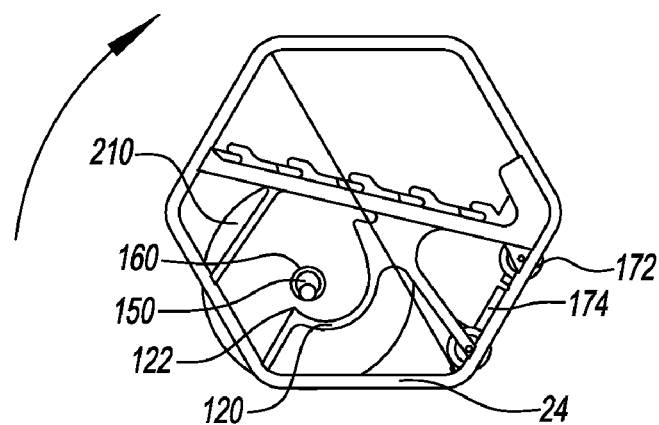
FIGS. 3A-3C are side views of the invention illustrating the set-up process.
Figure 3B:
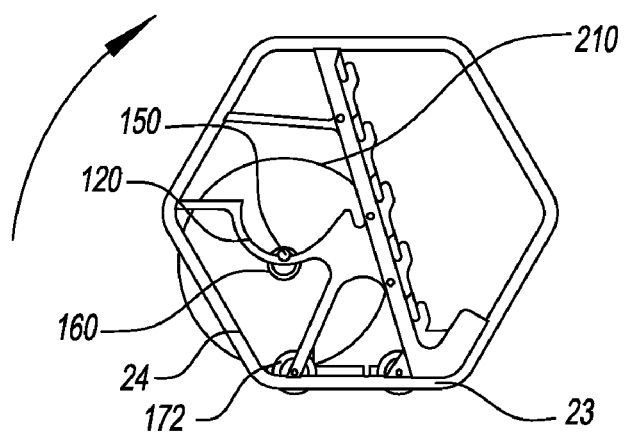
Figure 3C:
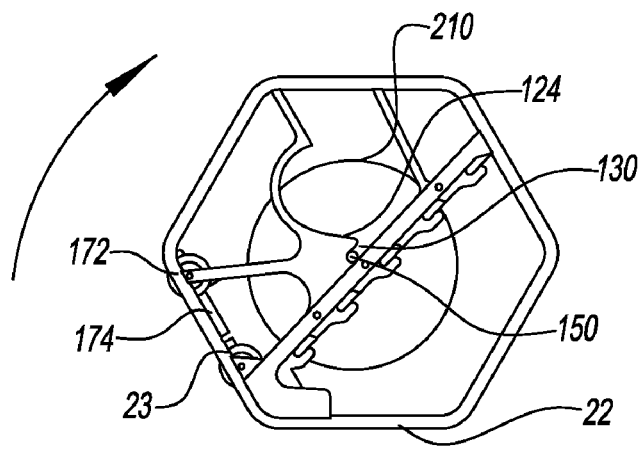

FIG. 3A-3C illustrates how the components of the axle support cam 100 may work together. The straight cam 110 is in place to connect the axle support cam 100 to the support frame. A main axle containing a spool is rolled past the straight cam 110 so that the main axle ends roll into the elliptical cam 120. The apparatus of FIG. 1A is then rolled facet over facet. As the invention is depicted in FIG. 3A-3C, the user would roll the apparatus in a clockwise direction. As the rolling occurs, the main axle rolls through the concave cam section 120, then into the locking cam 130. Once the main axle is in the locking cam 130, the user stops rolling the apparatus and it is ready for use. The user would then roll the apparatus counter-clockwise one facet onto the rolling aid to transport the product. In the preferred embodiment with the hexagonal shaped apparatus, the facets would aid in ceasing the rolling motion. In the case of an alternate embodiment with a different shape, the stop would contact the ground at the desired point, thereby ceasing the rolling motion of the apparatus. The weight of the main axle, spool, and spooled material combined with gravity keep the main axle in the locking cam during use.

When the user is done using the apparatus and wishes to release the main axle from the locking cam, he rolls the apparatus in the same clockwise direction. The main axle rolls out of the locking cam 130, along the terminator 140, and across the roll off aid 70 where it can be maneuvered out of the apparatus.

FIGS. 3A-3C are side views of the invention illustrating the set-up process. FIGS. 3A-3C show the apparatus 10, with first support frame 20, first support frame first facet 21, first support frame second facet 22, first support frame third facet 23, first support frame fourth facet 24, first support frame fifth facet 25, first support frame sixth facet 26.

Also shown are a roll-off aid 70, axle support cam support bar 106, a straight cam 110, an elliptical cam 120, a locking cam 130, terminator 140 with storage slots 144, main axle distal end 152, lateral flange 156, axle storage slot 158, spool 160, wire 164, mobility aid 170, wheel 172, wheel bar 174.

In FIGS. 3A-3C, the main axle ends protrude out of the spool that the wire is wound on so as to interact with the axle support cams.

FIG. 3A depicts the spool 160 with wire 164 disposed on the main axle 150 after the user has rolled them along the ground and into the apparatus 10. The user has positioned the main axle distal end 152 above the elliptical cam 120 by maneuvering the axle into place in the reel set up area (FIG. 1A). The straight cam 110 is joined to the first support frame 20 at the first support frame fifth facet 25, which is on the bottom left side.

FIG. 3B depicts the apparatus after rolling it one facet length. First support frame first facet 21 was on the top of the apparatus in FIG. 3A, and is now on the top right side, while first support frame fifth facet 25 is now moved up one facet length to the top left side. This has caused the main axle distal end 152 to move into the elliptical cam 120.

FIG. 3C depicts the apparatus after rolling it an additional facet length. First support frame first facet 21 is now on the bottom right side, while first support frame fifth facet 25 is now on the top. This has caused the main axle distal end 152 to move into the locking cam 130, where it is in position for the wire 164 to be unreeled for use. The main axle is now locked into place within the locking cams on the support frames.

Although the wire 164 is shown as unreeling from the bottom of the roll, the spool and axle can be positioned before rolling into the apparatus such that the wire unreels from the top of the roll. The mobility aid 170 is on a facet on each support frame that is off the ground so that the apparatus 10 doesn't move around while the wire 164 is being unreeled.

Figure 4:
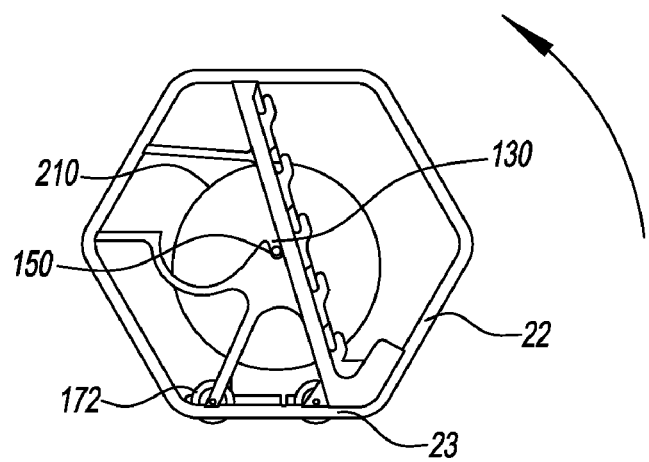
FIG. 4 is a side view of the present invention carrying a reel.

FIG. 4 is a side view of the present invention in use. FIG. 4 shows the apparatus 10, with first support frame 20, roll-off aid 70, straight cam 110, elliptical cam 120, terminator 140 with storage slots 144, main axle distal end 152, lateral flange 156, axle storage slot 158, spool 160, wire 164, mobility aid 170, wheels 172, and wheel bar 174.

FIG. 4 shows the invention in a position to be moved from place to place, for instance, from one room of a house to another room, or from the back of a truck down a ramp to a worksite. The apparatus has been rolled counter-clockwise one facet length to place the mobility aid on the ground. The locking cam continues to secure the main axle distal end 152 and therefore the main axle, spool 160, and wire 164 in position for use. Once the apparatus is transported to the desired place, it can be rolled one facet in the clockwise direction into the position seen in FIG. 3C to position it for dispensing the wire 164.

FIG. 4 also shows the axle storage slot 158, which allows the user to store the main axle 150 or another axle with the apparatus 10 when not in use. The axle 150 traverses the apparatus horizontally so that main axle first end 152 is disposed in an axle storage slot 158 in each of the two support frames. Although shown as a slot, the axle storage may be any shape that allows the user to store an axle, and the axle storage slot 158 may have a tie-down or other method for securing an axle in the slot. Other methods for securing the axle may be used either integral to the apparatus or as an attachment or an outside addition. The axle storage may allow for the storage of one or more axles of varying sizes and/or diameters.

Figure 4A:
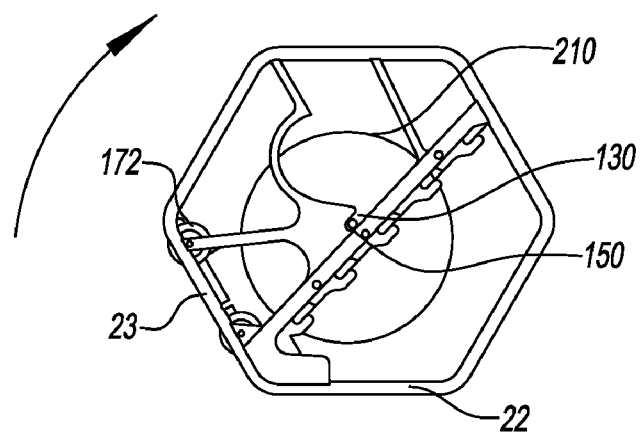
FIGS. 4A-4C are side views of the present invention illustrating the un-loading process.
Figure 4B:
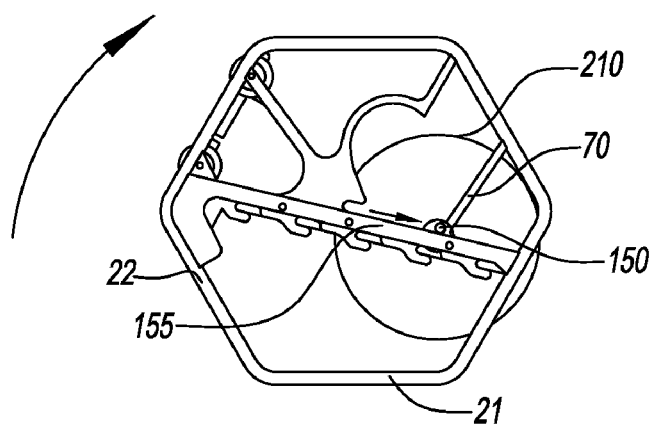
Figure 4C:
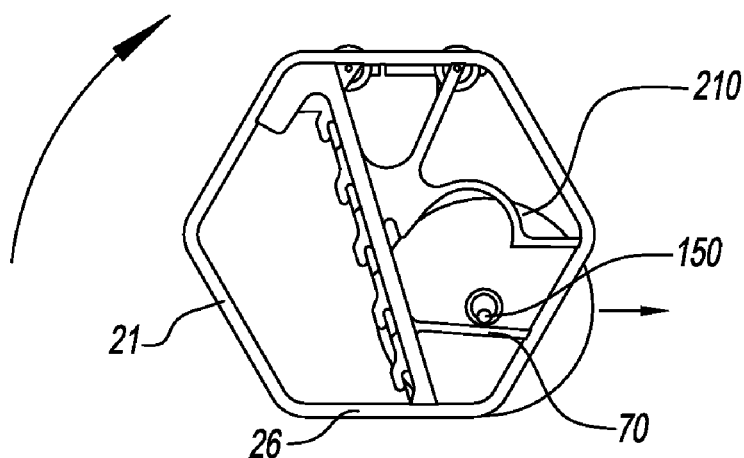

FIGS. 4A-4C are side views of the present invention illustrating the un-loading process and show the apparatus 10, with first support frame 20, first support frame first facet 21, first support frame second facet 22, first support frame third facet 23, first support frame fourth facet 24, first support frame fifth facet 25, first support frame sixth facet 26.

Also shown are a roll-off aid 70, locking cam 130, a flat-faced, substantially rigid terminator-bar 140, storage slots 144, main axle distal end 152, lateral flange 156, axle storage slot 158, spool 160, wire 164, mobility aid 170, wheel 172, and wheel bar 174.

FIG. 4A is essentially the same as FIG. 3C, and shows the invention in position for dispensing wire 164. As can be seen from the position of axle distal end 152, FIG. 4A shows the main axle with the spool 160 and wire 164 disposed in the apparatus 10, with the main axle distal end 152 disposed in the locking cam. First support frame first facet 21 is on the bottom right side, while first support frame fifth facet 25 is now on the top.

FIG. 4B shows the apparatus 10 after it has been rolled one facet length in the clockwise direction. First support frame first facet 21 is now on the bottom, while first support frame fifth facet 25 is now on the upper right side. As can be seen from the position of axle distal end 152, the main axle holding the spool 160 and wire 164 has rolled out of the locking cam 130 and down the terminator 140 to the roll-off aid 70.

FIG. 4C shows the apparatus 10 after it has been rolled one more facet length in the clockwise direction. First support frame first facet 21 is on the bottom left side, while first support frame fifth facet 25 is now on the bottom right side. As can be seen from the position of axle distal end 152, the main axle holding the spool 160 and wire 164 has disengaged from the apparatus, and is rolling out of the apparatus onto the floor.

The user may now retrieve the axle, spool and wire. If desired, the user may store the axle in the axle storage slot 158, or leave it in the spool for a later use. A user may have multiple spools or reels of materials that he uses in the same apparatus, each with its own main axle. The main axle may be removable or may be an integral part of a reel, such that the reel has a permanent main axle.

Although the figures show the present invention being used with one roll of material per axle, multiple rolls of material may be disposed on one axle side by side. Also, it is possible that many units of the invention could be deployed side by side and joined together in some matter, such as joining them with an attachment bar or other method.

A preferred embodiment of the invention is to operate it manually; in another embodiment the apparatus is capable of being attached to a mechanized equipment device. For instance, a motor may be employed to force clockwise and counter clockwise motion in order to roll the apparatus facet over facet, with pre-set start and stop conditions.

Figure 5:
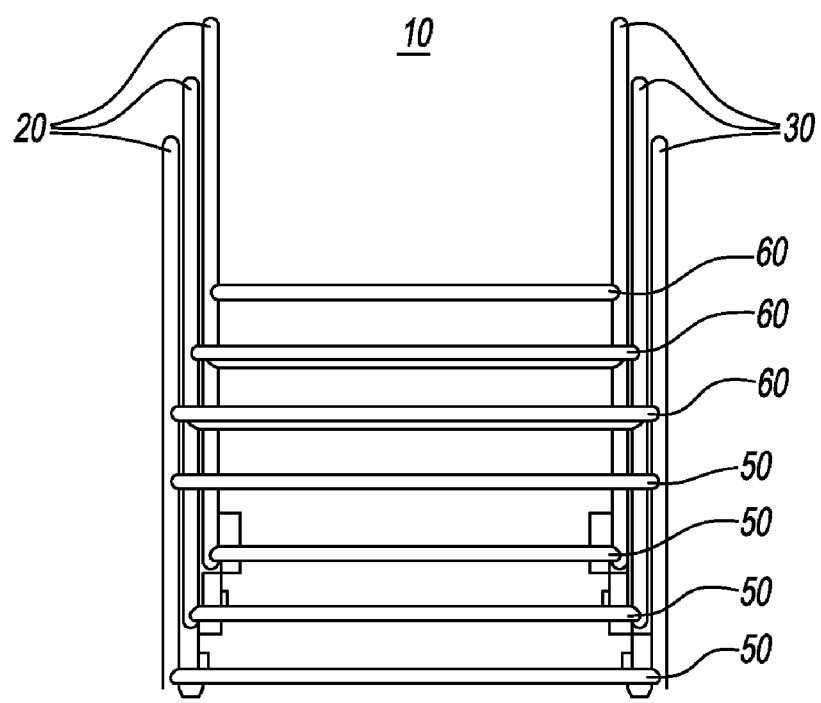
FIG. 5 is a front view of multiple units of the present invention stacked for storage.

FIG. 5 is a front view of multiple units of the present invention stacked for storage. FIG. 5 shows three units of the apparatus 10, each with first support frame 20, second support frame 30, stop 60, and connectors 50. Multiple units of the invention may be desired by a contractor, for instance, when users are simultaneously wiring multiple rooms of a house, or when one user is dispensing wire and one user is dispensing cable. If multiple units are desired, the stacking feature of the invention makes it easy to store and to move. The units may be stacked with or without the main axle in the axle storage slot.

Another use in which stacking units would be desirable would be for factory direct distribution of wire, carpet, cable, or other spooled materials on the apparatus 10. For example, a wire factory may purchase a large number of units of the apparatus that is custom made to fit their wire spools. The factory could then sell the wire spools disposed on an axle and in the apparatus. The factory may include axles that are integral with the spools; the spools could then be sold to distributors or direct to contractors, with the apparatus included as a rental. When a spool is emptied, the apparatus could be returned to the factory for re-use.

Larger spools of material may be disposed on an embodiment of the apparatus that has correspondingly larger dimensions, for instance, a roll of material 18 feet long may be disposed on an apparatus that is 20 feet in length by 10 feet in height and 10 feet in length. In cases like this, heavy machinery, including but not limited to trucks, forklifts, or smaller battery-operated forklifts, may be used to roll the apparatus to position the spool in the locked position and to transport it (on the mobility aid) around a warehouse.

Figure 6A:
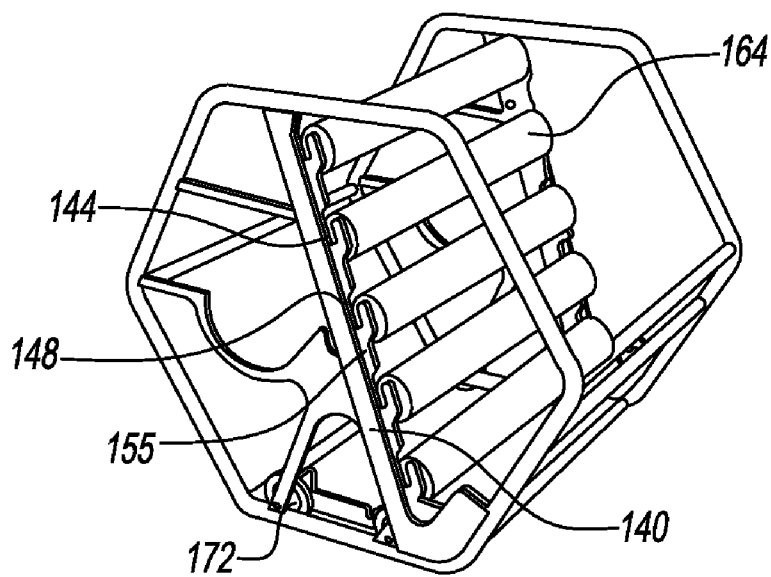
FIG. 6A is a perspective view of the present invention in use storing multiple spools.
Figure 6B:
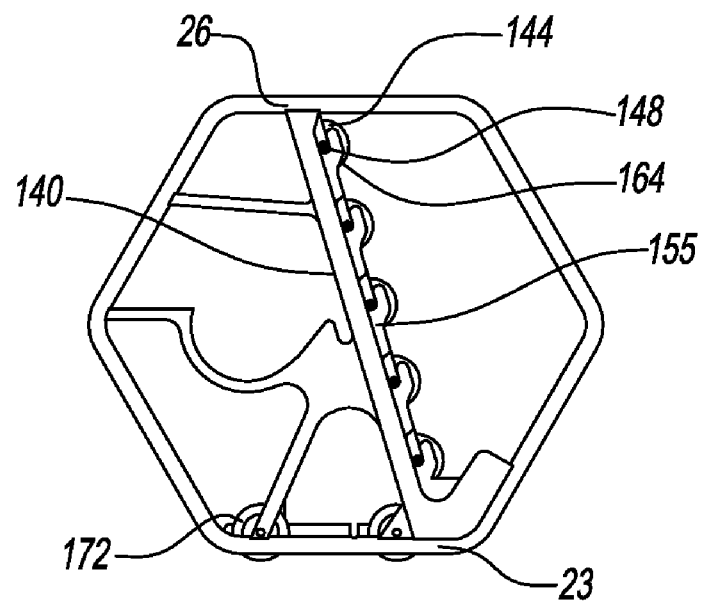
FIG. 6B is a side view of the present invention in use storing multiple spools.

FIG. 6A is a perspective view of the present invention in use storing multiple spools and FIG. 6B is a side view of the same embodiment.

FIGS. 6A and 6B show the apparatus 10, with first support frame 20, first support frame first facet 21, first support frame second facet 22, first support frame third facet 23, first support frame fourth facet 24, first support frame fifth facet 25, first support frame sixth facet 26.

Also shown are a roll-off aid 70, axle support cam support bar 106, a straight cam 110, an elliptical cam 120, terminator 140 with storage slots 144, storage rack 146, spool axle 148, axle storage slot 158, wire 164, mobility aid 170, wheel 172, wheel bar 174.

Spools of a material such as wire are placed on axles with each end of the axle engaged in storage slot 144. The storage slots are directly parallel to each other on the first support frame and the second support frame. Terminator 140 preferably covers the outside of cam plate 71 and serves as a stop to keep spool axle 148 from moving laterally. A spool of material traverses the width 90 of the apparatus so that one end of the spool axle 148 is in a storage slot 144 on the first support frame and the other end is in a storage slot on the second support frame. The size of the stored spools is such that multiple spools may be stored on the same apparatus. The storage rack 146 (illustrated more clearly in FIG. 2A) allows the user to store multiple spool axles when not in use.

A user places a spool axle 148 though the center opening of a spool of material, then places the spool axle in the storage slots 144. In a preferred embodiment, connectors 50 are located as shown in the drawings, and the connectors close proximity allows the user to place multiple reels directly on the connectors 50. The connectors thus serve as a mini-rack to keep the reels from moving rolling on the floor. The spool axle 148 can be slip through the center of the reels, and reels and spool axle 148 can be picked up as a single unit and placed in the storage slots 144. The shape and position of the storage slots makes it relatively easy to place any size spool in the apparatus, as long as the spool axle is long enough to traverse the apparatus length. A full spool of cable may be placed in one set of storage slots, while a half full spool of wire is placed in a different set of storage slots. FIG. 6 shows the apparatus with the storage slots in use; in this embodiment, the apparatus is in position to transport material. The user can apply a brake or stop to the mobility aid if necessary for stability while unspooling material.

Alternately, the storage slots may be designed such that the apparatus could be rolled one or more facet lengths without dislodging the spools. For instance, the storage slots may have locking mechanisms to lock a spool in place, or may have a shape that is designed to contain the spool axle in different positions. The spool axle itself may be designed to lock in place, or the shape and characteristics of the spool axle and storage slots may be designed to work together to keep a spool in place.

Although shown with five storage slots, the apparatus may have any number of storage slots. The number of storage slots may depend on the size of the apparatus. As mentioned earlier, differing apparatus sizes may be used for differing applications. The storage slots 144 may be disposed anywhere on the apparatus, for instance on one of the facets or on the mobility aid.

An invention that has storage capability for multiple spools is important because it allows a user ease in moving and dispensing multiple types of material. For instance, a user building a house may need to run cable throughout the house; the present invention provides an easy way to move the cable from room to room. The user may also need differing gauges or types of wire or differing types of cable for the same project. The different spools can be loaded onto the present invention at their source, then moved to the worksite and used throughout. Spools can also be stored on the apparatus until needed.

The spool axle 148 may be integral with the spool or spools or may be removable. If the axle is integral, a user could buy wire or cable on an axle and place it directly on the apparatus. Alternately, a stored spool axle may be removed from the storage rack 146 and placed through the center of the spool, then be placed in the storage slots 144 with the spooled material.

The support frames and components are depicted in the figures as a combination of bars, cams and notches. Alternatively, they may be a series of slots, grooves and supports that may be engraved, carved out, cut out, scored, notched, framed, molded, shaped, chiseled or otherwise devised within a single panel that represents either the first support frame 20 or the second support frame 30. They may be a single panel or a partial panel or a combination of panels. Alternatively, they may be a series of bars and cams that interconnect, which may have the same or different use, function or appearance than the preferred embodiment shown in the figures, but which do not deviate from the spirit of the invention. Some of the differences may be represented in alternative angles or positions of the functional cams, groves, notches and alignment elements, than those described herein. Additionally, either the first or the second support frames 20 or 30 may have unparallel elements or elements present in one support frame but absent in the other. For example one or both of the support frames, may have holds, slots, compartments, pockets, racks, supports, or any other protrusions and storage devices that are capable of holding, storing or containing various tools and other related equipment of different sizes and shapes. The apparatus shown in the figures is a preferred embodiment, but other alternatives and variations are possible without departing from the spirit of the present invention.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A spool reeling and dispensing cart apparatus, comprising;
    a first, substantially rigid, hexagonal support frame having at least a first, a second, a third, a fourth, and a fifth facet, wherein the five facets have a substantially similar width;
    a second substantially rigid, hexagonal frame being a substantially congruent version of said first hexagonal support frame, being positioned parallel to the first support frame, and having correspondingly a first, a second, a third, a fourth, and fifth facet, wherein the five facets have a substantially similar width;
    at least one roll prevention stop, said one roll prevention stop being fixedly connected at a first end to an inner side of a corner of said first support frame where the fourth facet and the fifth facet are connected and fixedly connected at a second end to an inner side of a corner of said second support frame wherein the fourth facet and the fifth facet are connected, said roll prevention stop being oriented substantially normal to a plane containing said first support frame, and substantially normal to a plane containing said second support frame;
    a first axle support cam oriented to lie in a plane of said first support frame and having a straight cam section, a concave cam section and an axle locking cam section, wherein the straight cam section directly attaches to the first support frame, and wherein the concave cam section and the axle locking cam section do not directly attach to the first support frame;

a second axle support cam oriented to lie in a plane of said second support frame and having a straight cam section, a concave cam section and an axle locking cam section, wherein the straight cam section directly attaches to the second support frame, and wherein the concave cam section and the axle locking cam section do not directly attach to the second support frame;

at least two substantially rigid connector rods, each fixedly connected at a first end to said inner side of said first, support frame and at a second end to a substantially corresponding location on said inner side of said a second support frame, said connector rods being oriented to be substantially normal to both a plane of said first support frame and to a plane of said second support frame;

a first axle storage rack, being substantially straight and having at least two axle storage slots linearly aligned on the first axle storage rack, said first axle storage rack being fixedly attached to at least the third facet of said first support frame;

a second axle storage rack, being substantially straight and having at least two axle storage slots linearly aligned on the second axle storage rack, said second axle storage rack being fixedly attached to at least the third facet of said second, support frame, and where said axle storage slots of said second storage rack are aligned to said axle storage slots of said first storage rack such that a line joining corresponding points of said slots is substantially normal to both of the plane that each contain one of said support frames;

a first and second flat-faced, substantially rigid terminator-bar, each fixedly connected to an outside face of said axle storage racks, and each partially occluding said axle storage slots.

2. The apparatus of claim 1, wherein each said concave cam section is an elliptical cam section.

3. The apparatus of claim 1, wherein said first axle support cam further comprises a first roll-off aid cam section having a roll off cam first end connected to the fifth facet of the first support frame and oriented to lie in a plane of said first support frame.

4. The apparatus of claim 1, further comprising a removable main axle said removable main axle being removably mounted on and spanning a distance between each said axle support cams.

5. The apparatus of claim 1, further comprising a material reel, wherein said reel has a permanent main axle, said permanent main axle being removably mounted on and spanning a distance between each said axle support cams.

6. The apparatus of claim 4, wherein said removable main axle is temporarily locked into place within said axle locking cam section.

7. The apparatus of claim 4, further comprising an axle lateral flange on a main axle first end and a main axle second end of said removable main axle.

8. The apparatus of claim 2, further comprising a mobility aid attached to the third facet of said first support frame or said second support frame.

9. The apparatus of claim 8, wherein said mobility aid comprises at least one wheel.

* * * * *